United States Patent [19]
Swanson et al.

[11] Patent Number: 5,946,301
[45] Date of Patent: Aug. 31, 1999

[54] CIRCUIT FOR DETERMINING LOCAL AREA NETWORK SPEED

[75] Inventors: Paul Sigurd Swanson, Monument; William Robert Marbaker, Colorado Springs, both of Colo.

[73] Assignee: Fluke Corporation, Everett, Wash.

[21] Appl. No.: 08/800,352

[22] Filed: Feb. 14, 1997

[51] Int. Cl.[6] .................................................. H04L 12/42
[52] U.S. Cl. ........................... 370/252; 270/245; 270/241
[58] Field of Search ..................................... 370/252, 245, 370/241

[56] References Cited

PUBLICATIONS

"EtherExpress PRO/100 Adapter Family" data sheet, Intel Corporation, 1996.

Johnson, Howard W., "Fast Ethernet—Dawn of a New Network", pp. 95–101, 170–175, 1996, Prentice–Hall, Upper Saddle River, New Jersey.

*Primary Examiner*—Jeffery A. Hofsass
*Assistant Examiner*—Rafael A. Perez-Pineiro

[57] ABSTRACT

A circuit for sensing network speed in a test instrument for local area networks (LANs) is provided. After coupling the test instrument to the LAN of unknown speed, a link pulse is found among the twisted-wire pairs so that the test instrument is configured for the transmit and receive pairs. The link pulse is then coupled to a comparator that compares the received voltage against a predetermined reference voltage level to develop a trigger signal. The trigger signal is received by a timer circuit which measures time values from the link pulse. The time values are collected by a microprocessor are then compared against a decision value to reach a decision whether the test instrument is coupled to a link running 10BASE-T protocol, 100BASE-T protocol, or a 10/100 dual-speed device. After the decision has been determined, the appropriate chipset is then powered up and coupled to the LAN, thereby minimizing battery drain and preventing errors from being introduced in the LAN by the test instrument.

24 Claims, 8 Drawing Sheets

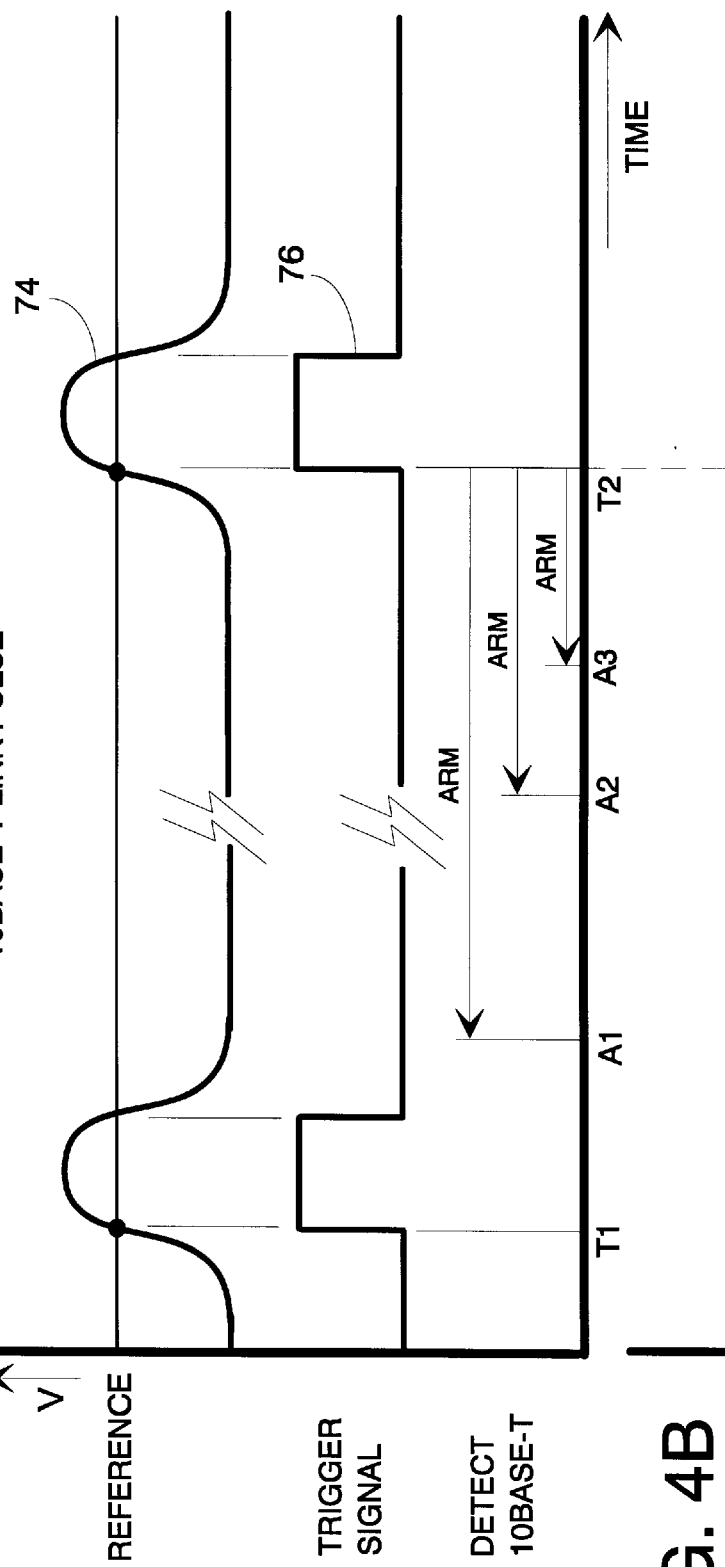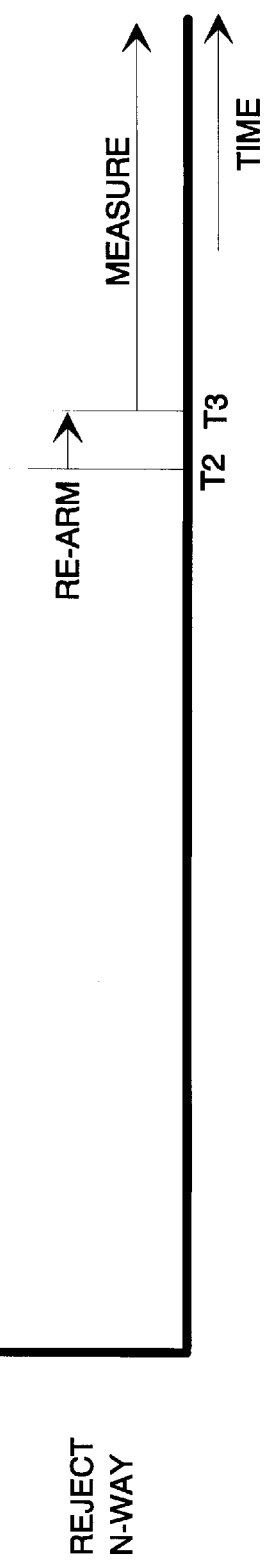
FIG. 4A
FIG. 4B

CIRCUIT FOR DETERMINING LOCAL AREA NETWORK SPEED

BACKGROUND OF THE INVENTION

This invention relates generally to test instruments for local area networks and in particular to a circuit for determining the speed of a local area network.

Increasingly complex LANs now connect more and more types of devices including personal computers, work stations, file servers, and printers. Network hubs are often the central devices in a network through which information flows. Each client device connects to the LAN via adapters called network interface cards (NICs) to form nodes. Connecting the nodes to the hubs are network links which may be unshielded twisted pair (UTP) wire, coaxial cable, or fiber optic cable.

Network protocols for controlling the communication of information between the nodes have been developed, the most common being Ethernet or 10BASE-T which is defined according to the IEEE 802.3 standard. Ethernet has a speed of 10 megabits per second and uses a media access protocol called carrier-sensing multiple access with collision detection (CSMA/CD) to control information traffic flow and resolve collisions between nodes. A node can send information on the network only if no other node is currently sending information. If a node tries to send information at the same time as another node, a collision occurs and each node operates according to a well-defined "back off" procedure to resolve the collision. Each node will wait a random period of time to attempt to send the information again.

Because Ethernet is typically implemented in a baseband, broadcast network, every node receives the information sent by every other node within the collision domain. In order to minimize the burden on the software operating in host personal computers (PC's) connected to the network, a hardware layer with a hardware or media access control (MAC) address passes along to the software layer only the information appropriate for that node. Such information may be in the form of a "broadcast" message intended for all nodes in the network or as a message only for the intended node with the MAC address.

Information sent over an Ethernet network is in the form of discrete packets defined according to the seven layer Open Systems Interconnection (OSI) standard maintained by the American National Standards Institute (ANSI). OSI is a layered structure in which the highest layers take advantage of the capabilities of the lower layers to send information between nodes. Information is passed between nodes in the form of discrete packets containing data or control information supplied by the various OSI layers. The highest layers are the Application layer, the Presentation layer, and the Session layer which may include Telnet, File Transfer Protocol (FTP), Simple Mail Transfer Protocol (SMTP), and Domain Name System (DNS).

The Transport layer typically includes the Transmission Control Protocol (TCP) along with the User Datagram Protocol (UDP), among others, which provide for the delivery of the data to a desired device and the division of the information into discrete packets for sending. Received packets are reassembled in a like manner. The Network layer routes messages back and forth between a source node and a destination node according to Internet Protocol (IP) addresses by adding an IP header to each packet indicating the source and destination IP addresses. The lowest layer is the physical link layer in which the hardware MAC addresses are used.

Fast Ethernet is a new local area network standard commonly known as 100BASE-T which is specified under IEEE 802.3u to provide a ten-fold increase in speed over the original 10BASE-T Ethernet while maintaining the same media access protocol. While the packets are sent faster over a 100BASE-T link, the network layer and transport layers are otherwise unaffected by the speed difference, allowing for LANs containing both 10BASE-T and 100BASE-T links. Because of the considerable investment in 10BASE-T networks and the interoperability between the 10BASE-T and 100BASE-T standards, many LANs will consist of both 10BASE-T and 100BASE-T links.

The 100BASE-T links will typically used in links requiring the most data-carrying capacity to resolve network congestion problems, such as between a shared hub and a file server. The 100BASE-T links require higher bandwidth twisted pair wiring which conforms to the industry-standard known as Category 5 as specified under EIA/TIA 568-A for building wiring standards. The presence of both speeds on the same LAN has given rise to dual speed network hardware that can be readily configured to handle either speed.

Network interface cards, shared hubs, and other LAN hardware are now commercially available that allow for automatically switching between 10BASE-T and 100BASE-T (dual speed 10/100). In both 10BASE-T and 100BASE-T networks, basic connectivity between devices on a link is established and maintained by the presence of the link pulse. A shared hub will provide a link pulse that is received by the NIC upon boot-up. Loss of the link pulse signals the other device that the communications link has been lost. Network traffic is not normally forwarded on a link that has not established communications so the link pulse is often the only signal available without using the chipsets to initiate communications. Link pulses for 10BASE-T and 100BASE-T networks have substantial differences in their frequency characteristics.

As specified under IEEE 802.3u, clause 28, auto-negotiation allows for dual speed adapter cards to be installed in a network without having to change settings manually. Each adapter card typically contain one or more chipsets to handle the task of communication with the LAN. Each time the adapter card is booted up, the auto-negotiation algorithm first exchanges information with the device on the far end of the link to determine common operating modes and then selects the highest priority mode for the chipset to communicate with. The link pulse sent by a dual-speed adapter card is known as an "N-Way Link Pulse" that allows 10BASE-T, 100BASE-T, or dual-speed adapter cards to properly begin communication.

Auto-negotiation between dual-speed devices, in order to operate properly, requires the use of chipsets that are powered up and operating with compatible communication modes on both ends of the link. Auto-negotiation further requires that the installed cable comprising the link be configured according to a set of presumptions about the cable wiring. However, in a test instrument for a LAN, such assumptions may not be valid, requiring more versatility and improved capability for proper configuration. Cables may be misconfigured and have different configurations depending on the devices at each end of the link, including hub-to-NIC connections and hub-to-hub connection. Battery consumption is a significant concern in a handheld portable test instrument, making it desirable to operate the relatively high power-consuming chipsets only when needed. Therefore, it would be desirable to provide a circuit for detecting the speed of a LAN in a test instrument using a circuit by analyzing the frequency content of the link pulse before powering up and connecting the appropriate chipset.

SUMMARY OF THE INVENTION

In accordance with the present invention, a circuit for sensing network speed in a test instrument for local area networks (LANs) is provided. The test instrument is coupled to a LAN typically via a type RJ-45 connector and patch cable to receive the link pulse. The LAN may consist of links using the Ethernet (10BASE-T) protocol operating at 10 megabits per second and other links using the Fast Ethernet (100BASE-T) protocol operating at 100 megabits per second. The test instrument contains two chipsets, a 10BASE-T chipset for coupling to the 10BASE-T links and a 100BASE-T chipset for coupling to the 100BASE-T links. The chipsets tend to draw a substantial amount of power and it is desirable that they be turned off during idle periods when the test instrument is not coupled to a LAN. It is important that only the appropriate chipset be coupled to a particular link to avoid causing errors on the LAN.

After coupling the test instrument to a LAN having an unknown speed, a multiplexer selectively couples each of the wire pairs from the LAN to determine which twisted-wire pair is the transmit pair and which is the receive pair for that link by measuring the relative signal amplitudes in each pair in order to properly configure the test instrument to the link and acquire the link pulse. In this way, the test instrument is connected properly to the LAN the first time thereby avoiding errors on the LAN from the test instrument.

After the receive pair is determined, the link pulse provided by the LAN is coupled to a comparator that compares the link pulse voltage against a predetermined reference voltage level to develop a trigger signal. The trigger signal is received by a timer circuit which determines a time values between when the timer circuit was armed and when the trigger signal was received. Successive time values are collected by a microprocessor until a composite time value with sufficient accuracy is determined. The composite time value is then compared against a decision value to discriminate between Ethernet and Fast Ethernet speeds.

Based on the comparison, a decision is reached whether the test instrument is coupled to a LAN running 10BASE-T or 100BASE-T. The LAN may then be coupled to the either the 10BASE-T or the 100BASE-T chipset responsive to the decision. If the link pulse is an N-Way link pulse associated with a dual-speed device capable of either 10BASE-T or 100BASE-T on the other end of the link, either chipset may be selected, typically according to a predetermined default option or a user input. At the same time, the appropriate chipset is powered up only when needed to initiate communications with the LAN, thereby minimizing battery drain until the decision is reached. When the test instrument is disconnected from the LAN, the chipsets are powered off and disconnected from the RJ-45 connector until needed again.

By determining beforehand the appropriate chipset to power up and couple to the LAN along with the proper cable configuration with the link, the possibility of the test instrument causing errors in the LAN are minimized. By powering up the appropriate chipset only when needed, battery power consumption by the test instrument is minimized, thereby extending useful battery life when the test instrument is not connected to a LAN.

One object of the present invention is to provide a circuit for determining network speed.

Another object of the present invention is to provide a method for determining network speed based on the frequency content of the link pulse.

A further object of the present invention is to provide a test instrument capable of determining of properly configuring itself for cable configuration and network speed upon being coupled to a local area network.

Other features, attainments, and advantages will become apparent to those skilled in the art upon a reading of the following description when taken in conjunction with the accompanying drawings.

BRIEF DESCRIPTION OF THE DRAWINGS

FIGS. 4A and 4B are graphs (not to scale) showing the waveform of a typical 100BASE-T link pulse as measured according to the present invention;

DETAILED DESCRIPTION OF THE INVENTION

Figure 1:
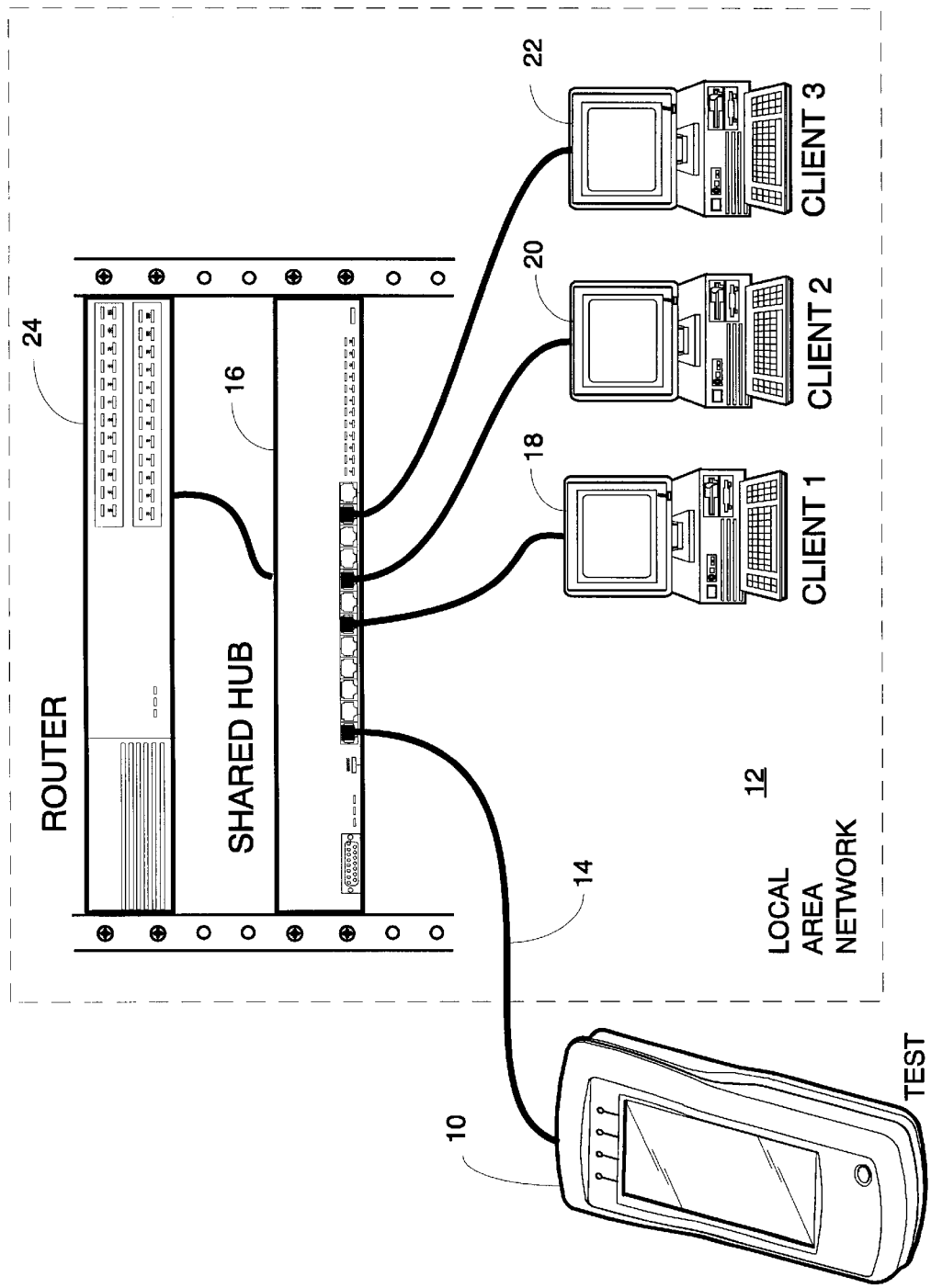
FIG. 1 is an illustration (not to scale) of a test instrument connected to a local area network (LAN) is operating at an unknown speed.

FIG. 1 is an illustration (not to scale) of a test instrument 10 as applied to testing a local area network (LAN) 12 of unknown speed. The test instrument 10 is designed to be handheld, portable, and battery-operated, requiring that the circuits within the test instrument 10 draw relatively little power to extend battery life. In testing the LAN 12, it is critical that the test instrument 10 not disrupt or cause errors to occur in the LAN 12. Such errors can occur by connecting incompatible hardware such as a chipset having a different speed from that of the LAN 12.

As shown, the LAN 12 is typical of what may be encountered in service, installation, and maintenance applications for a test instrument 10. A shared hub 16 is coupled to devices 18, 20, and 22, labeled CLIENT 1, 2, and 3 respectively to form a local segment. A router 24 connects the local segment to other remote segments (not shown). The connections between the devices 18, 20, and 22, the router 24, and the shared hub 16 are links, with each link potentially operating at different speeds. The LAN 12 may be implemented using the Ethernet 10BASE-T protocol which provides for a base-band network in which the devices 18, 20, and 22 communicate with each other using data formatted as frames or packets at a 10 megabit per second speed. The LAN 12 may also be implemented using the Fast Ethernet 100BASE-T protocol which increases the speed to 100 megabits per second while maintaining the same media access control protocols.

The LAN 12 may also be a hybrid of both 10BASE-T and 100BASE-T protocols. For example, the shared hub 16 may allow for the devices 18, 20, and 22 to communicate using the 10BASE-T protocol on the local segment. At the same time, the shared hub 16 may contain a 100BASE-T port for a higher speed connection to the router 24 where there may be a bottleneck in the information flow. Thus, in connecting the test instrument 10 to the LAN 12 or to any particular link in the LAN 12, the speed may not be known ahead of time. Dual-speed devices on a link, capable of either 10BASE-T or 100BASE-T operation, may also be detected, allowing for either protocol to be used.

When the test instrument 10 is initially connected to the shared hub 16, a link pulse generated by the shared hub 16 may be found by the test instrument 10. The link pulse is used to establish communications with network devices and to provide a continuing indication that the link is still valid, regardless of the volume of traffic. Normally, network traffic is not forwarded on any particular link until communications have been established between the network devices. In the test instrument 10, it is desirable that the network speed be determined by measuring the time characteristics of the link pulse before having to power up and connect the appropriate chip set to establish communications.

Figure 2:
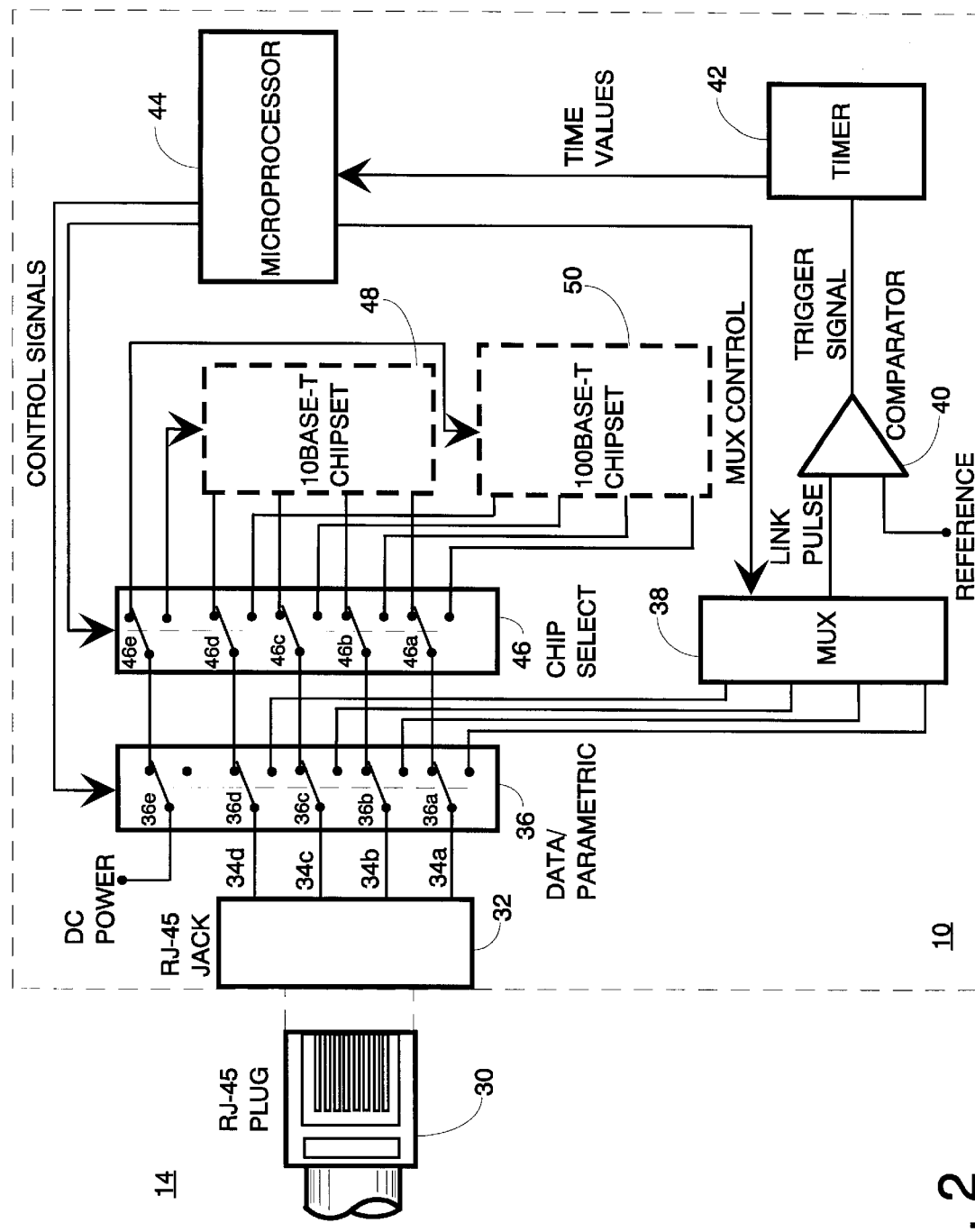
FIG. 2 is a simplified schematic diagram of a speed sensing circuit according to the present invention in the test instrument of FIG. 1.

FIG. 2 is a simplified schematic diagram of a speed sensing circuit according to the present invention as implemented in the test instrument 10. The patch cord 14 having a plug 30, typically a modular (RJ-45) plug, on one end is coupled to the test instrument 10 while the other end of the patch cord 14 is coupled to the LAN 12. The plug 30 is connected to a jack 32, typically a modular (RJ-45) jack, which provides connections to four twisted-wire pairs in the patch cord 14 according to industry convention.

One transmit pair, consisting of the wires 34a and 34b, and one receive pair, consisting of the wires 34c and 34d, are illustrated. The transmit pair comprises one twisted-wire pair and the receive pair comprises another twisted-wire pair within the patch cord 14. The transmit and receive pairs may readily be swapped as needed for test purposes, typically using an additional set of switches which are not illustrated. The transmit pair and receive pair typically are not known beforehand because cable configurations differ depending on the types of devices on either end of the link, such as hub-to-NIC links and hub-to-hub links. The link pulse from the LAN 12 is typically obtained across the receive pair. The test instrument 10 is thus configured to match the cable configuration according to the proper transmit and receive pairs.

The wires 34a–d are each coupled to a set of switches 36a–d respectively which are ganged together within a data/parametric switch 36. The switches 36a–d alternatively switch the wires 34a–d of the connector 32 between a data position and a parametric position, with the parametric position being the default position when the test instrument 10 is not connected to the LAN 12. In the parametric position, each of the wires 34a–d of the connector 32 is coupled to an input of a MUX 38 which is an analog multiplexer that selectively couples one of the wires 34a–d carrying a valid link pulse to an output of the MUX 38 responsive to a MUX control signal from the microprocessor 44.

Another switch 36e may also be included in the data/parametric switch 36 which is coupled to a voltage labeled D.C. POWER. D.C. POWER is the battery voltage in the preferred embodiment which is used to provide the operating voltage and current to the chipsets. In this way, D.C. power is enabled only in the data position. The data/parametric switch 36 may be constructed of ganged relays, analog switches, multiplexers, or other suitable switching technology.

The output of the MUX 38 is coupled to an input of a comparator 40. Another input of the comparator 40 is coupled to a reference voltage labeled REFERENCE which is a d.c. voltage having a level selected to provide a trigger level based on the voltage levels of the link pulse. The trigger level is preferably at a level between two extreme voltage levels that define a transition from one state to another in the link pulse. The reference level may be generated by a digital to analog converter (not shown) under control of the microprocessor 44.

Based on the comparison of the link pulse to reference voltage, the comparator 40 provides a trigger signal to a timer 42 which in turn measures the time interval between when the timer 42 is armed and when it receives the trigger signal from the comparator 40 to provide time values as explained in more detail below. The time values are coupled to a microprocessor 44 which processes a series of such time values to obtain a composite time value.

With the switches 36a–d in the data position, the wires 34a–d are coupled to switches 46a–d respectively within a chip select switch 46. The D.C POWER from switch 36e is coupled to a switch 46e within the chip select switch 46. The switches 46a–e are ganged together to switch between a 10BASE-T position and a 100BASE-T position. A 10BASE-T chipset 48 is coupled to the switches 46a–d to receive and transmit data signals to and from the LAN 12 when the switches 46a–d are in the 10BASE-T position as shown. The 10BASE-T chipset 48 is also coupled to the switch 46e to receive the D.C. power so that the 10BASE-T chipset 48 is powered up only when the switch 46e in the chip select switch 46 is set to the 10BASE-T position.

Each of the data/parametric switch 36 and the chip select switch 46 have a control input coupled to the microprocessor 44 for switching each of the switches 36a–d and 46a–e responsive to control signals received from the microprocessor 44. The chip select switch 46 may be constructed of ganged relays, analog switches, multiplexers, or other suitable switching technology.

A 100BASE-T chipset 50 is coupled to the switches 46a–d to receive and transmit data signals to and from the LAN 12 when the switches 46a–d are in the 100BASE-T position. The 100BASE-T chipset 48 is also coupled to the switch 46e to receive the D.C. power so that the 100BASE-T chipset 50 is powered up only when the switch 46e is in the 100BASE-T position. Alternatively, the D.C. POWER may be separately disabled or switched off when no link pulse is present by having a third position of the switch 46e so that neither the 10BASE-T chipset 48 nor the 100BASE-T chipset 50 are powered up unless the 10BASE-T or 100BASE-T positions are affirmatively selected.

Figure 3:
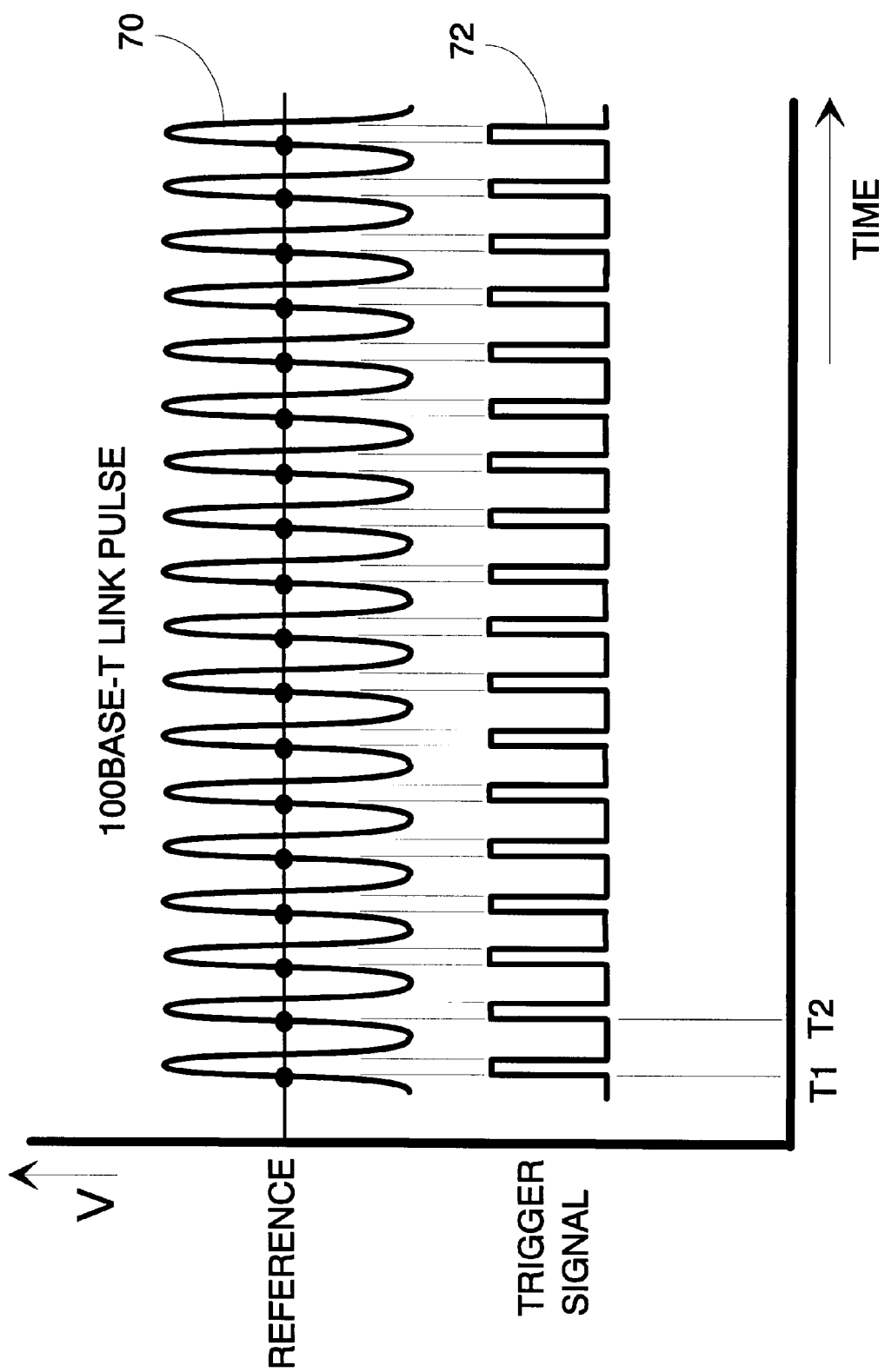
FIG. 3 is a graph (not to scale) showing the waveform of a typical 10BASE-T link pulse as measured according to the present invention.

FIG. 3 is a is a graph (not to scale) showing a waveform 70 of a 100BASE-T link pulse expressed in terms of voltage (V) versus time and a waveform 72 of the trigger signal generated by the comparator 40 (shown in FIG. 2) response to the 100BASE-T link pulse.

Superimposed on the waveform 70 is the reference voltage labeled REFERENCE that is selectively set to a middle voltage value that occurs during the maximum voltage transition rate in order to obtain the most stable trigger times. As shown, the time T2 is the trigger which is arbitrarily chosen to be the positive-going transition where the link pulse signal exceeds the reference voltage. The timer 42 is armed at any time up to the previous trigger time and provides a time value of the time interval between the arming time and the trigger event time. Because the arming time is not synchronized to the timing of the pulses the time value, the time value measured by the timer 42 is randomly distributed between T1 and T2. The times T1 and T2 are defined according to the trigger events indicated by the solid dots where the link pulse voltage value rises above the reference voltage level, causing the trigger signal to change states. The time interval between subsequent pulses as indicated by T1 and T2 is less than 100 nanoseconds for a 100BASE-T link pulse, making its presence readily detectable.

By combining the various time values obtained to obtain a composite time value, an average time value may be obtained that is one half of the time T2–T1. A sufficient number of time values may be used to obtain a desired level of accuracy of the composite time value. In practice, relatively few such time values will be needed because of the wide difference in time values expected between 10BASE-T and 100BASE-T measurements.

FIG. 4A and 4B are graphs (not to scale) showing the process of detecting a 10BASE-T link pulse and distinguishing it from an N-Way link pulse. In FIG. 4A, a waveform 74 of a 10BASE-T link pulse expressed in terms of voltage (V) versus time and a waveform 76 of the trigger signal generated by the comparator 40 responsive to the 10BASE-T link pulse. The pulse width of each of the pulses is typically 100 nanoseconds while the repetition time expressed as T2–T1 is approximately 2 milliseconds. The time interval between subsequent pulses is measured in the same manner as discussed above. The 100BASE-T link pulse differs from the 10BASE-T link pulse in that the time interval between subsequent pulses is less than 100 nanoseconds for a 100BASE-T link pulse and over 1 millisecond for a 10BASE-T link pulse.

While the presence of long time intervals associated with 10BASE-T has been detected, the possibility exists that the waveform 74 actually belongs to the N-Way link pulse which contains a combination of long time intervals and short time intervals. The next step is shown in FIG. 4B in which the timer 42 is re-armed at time T3 responsive to the trigger signal received at time T2 so that high frequency content may be detected in the link pulse. The time between T2 and T3 is delay time necessary for the timer 42 to re-arm and is typically very short so that short time intervals in the link pulse may be measured. In this case, no further trigger signals are received exceeding a time interval over 1 millisecond and the possibility of an N-Way link pulse is therefore rejected.

The circuit of the present invention using the comparator 40 to generate the trigger signal was employed in the preferred embodiment because of the relatively low cost of the components and the low level of resolution required to distinguish between 10BASE-T and 100BASE-T link pulses. Other counter/timer circuits may be readily employed that allow for precise measurements of the time interval between triggers. For example, the arming time may be readily synchronized to the trigger signal such that the arm time and trigger time occur on subsequent pulses thereby reducing the number of time values needed to be measured. The choice of counter/timer circuits may depend on various factors such as cost, availability of components, and the level of time interval measurement accuracy desired.

Figures 5A, 5B:
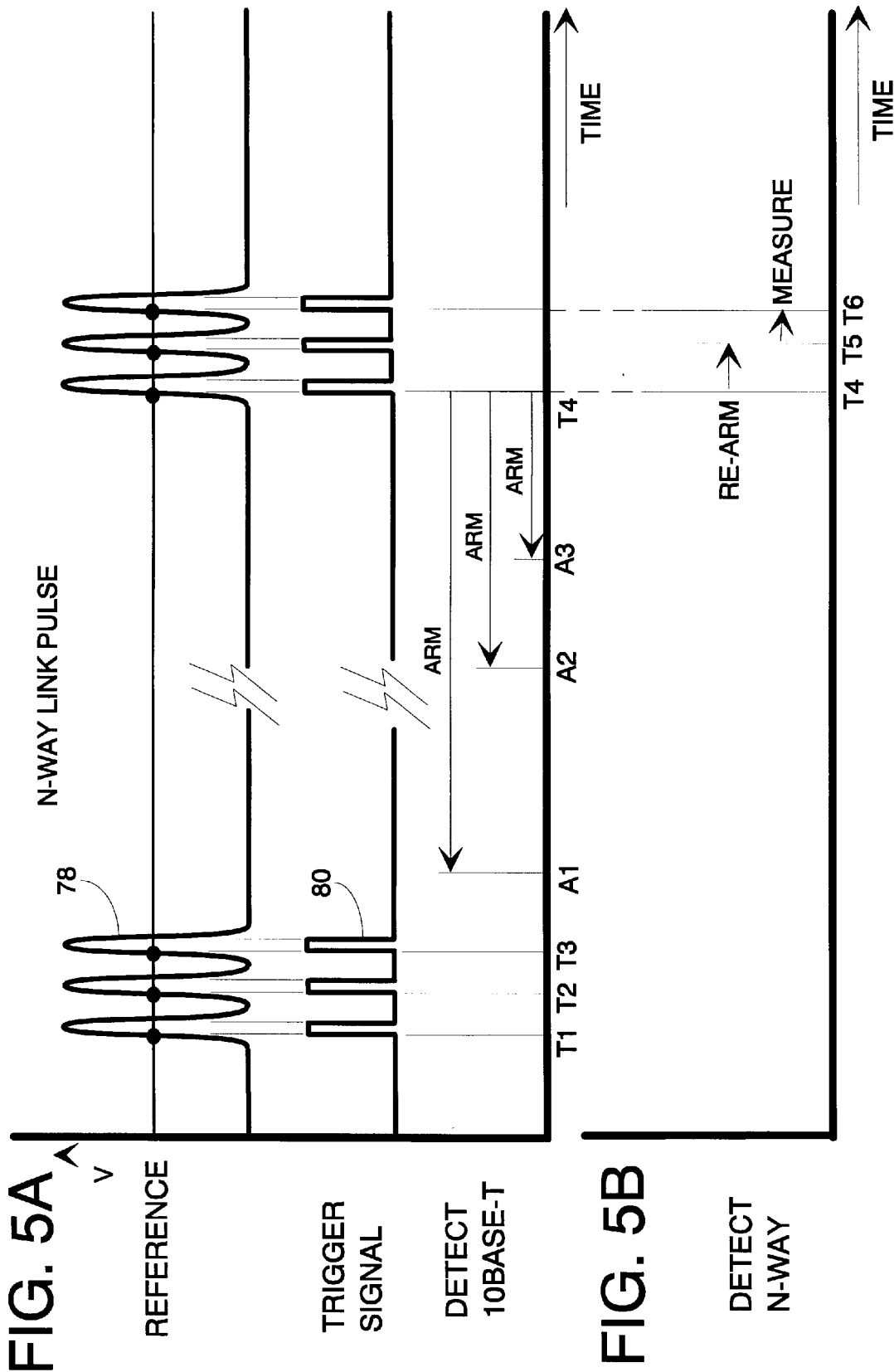
FIG. 5A and 5B are a graph (not to scale) showing the waveform of a typical N-Way link pulse as measured according the present invention.

FIG. 5A and 5B are graphs (not to scale) showing the process of detecting an N-Way link pulse and distinguishing it from a 10BASE-T link pulse. In FIG. 5A, there is shown a waveform 78 of an N-Way link pulse expressed in terms of voltage (V) versus time and a waveform 80 of the trigger signal generated by the comparator 40 responsive to the N-Way link pulse. The time interval between subsequent pulses is measured in the same manner as discussed above.

The N-Way link pulse shares characteristics of the 100BASE-T link pulse of FIG. 4 and the 10BASE-T link pulse of FIG. 3, allowing cross-compatibility between devices capable of operating according to 10BASE-T, 100BASE-T, and dual speed 10/100 devices. In the N-Way link pulse, a burst region of pulses having a time interval less than 100 nanoseconds common to a 100BASE-T link pulse are separated by time intervals over 1 millisecond common to a 10BASE-T link pulse.

The circuit according to the present invention measures time intervals in the same way as illustrated in FIG. 3 and 4A–B. Because the arming time is not synchronized to the N-Way link pulse in the first measurement, it may fall anywhere in a period of the N-Way Way link pulse which is defined by the time between T1 and T4. The pulse width of each of the pulses is typically 100 nanoseconds while the repetition time expressed as T4–T1 is approximately 2 milliseconds. The presence of long time intervals will force the conclusion first that the link pulse is not 100BASE-T and that the link pulse may be 10BASE-T or N-Way, leading to the further step shown in FIG. 5B, which operates in the same manner as that of FIG. 4B. Now, the timer 42 re-arms at the time T5 in response to the re-arm signal received at time T4 and a measured time interval for the time between T5 and T6 is returned. Because this is a short time interval, N-Way link pulse may be readily distinguished from the 10BASE-T link pulse.

Figure 6:
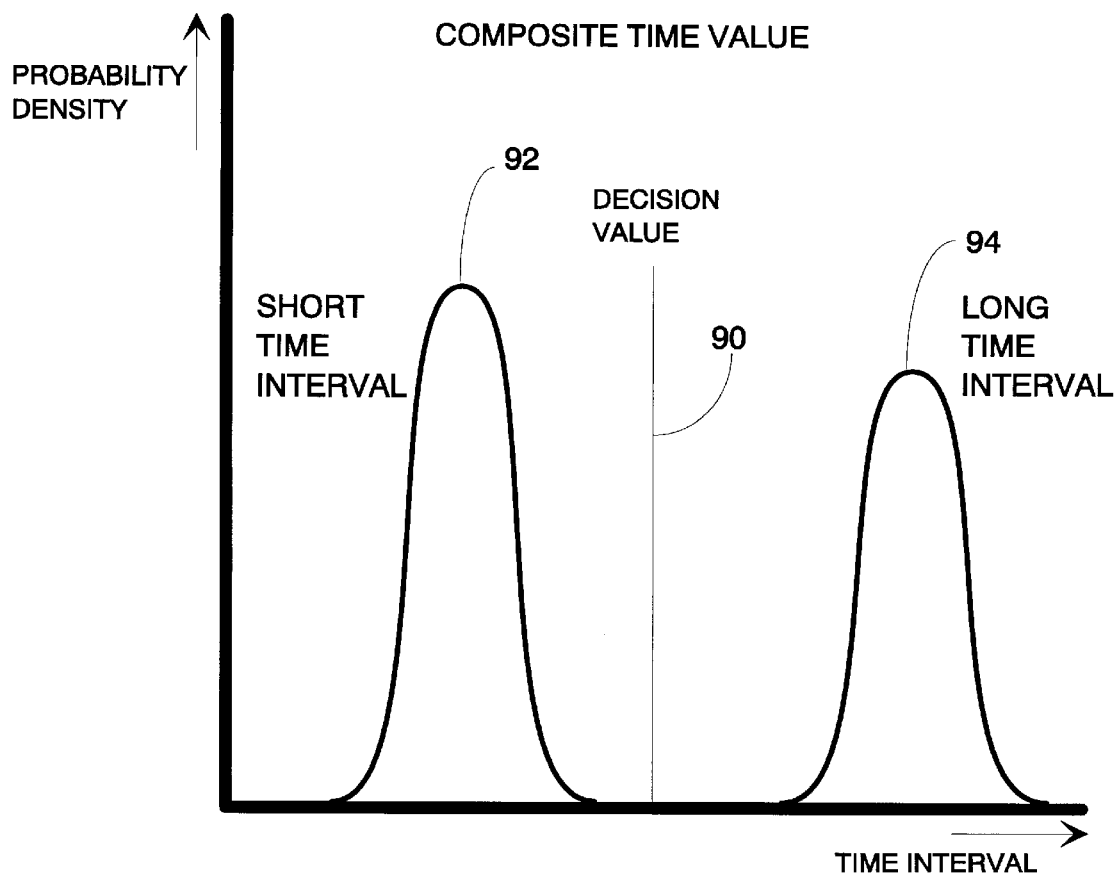
FIG. 6 is a graph (not to scale) of the composite time value in terms of probability density versus time interval and a decision value to discriminate between short and long time intervals in the time values.

FIG. 6 is a graph (not to scale) of a composite time value shown as a probability density versus time interval level as compiled from a series of time values collected from successive measurements of a link pulse which contains both 10BASE-T and 100BASE-T characteristics. The decision value 90 has a time value chosen to optimally discriminate between short time intervals and long time intervals. A peak 92 is centered in the region of 100 nanoseconds corresponding to a 100BASE-T link pulse or the burst region of an N-Way link pulse. A peak 94 is centered in the region of 1 millisecond corresponding to the 10BASE-T link pulse or the region between bursts of the N-Way link pulse. The peak 92 thus forms the probability density of expected time values collected over of series of successive measurements of a link pulse containing fast time intervals. The peak 94 forms the probability density of expected time values collected over a series of successive measurements of a link pulse containing slow time intervals.

If only the peak 92 is present in the composite time value which is less than the decision value 90, then the link pulse is identified to be a 100BASE-T link pulse. If only the peak 94 is present in the composite time which is greater than the decision value 90, then the link pulse is identified to be a 10BASE-T link pulse. If both the peak 92 and the peak 94 are present, then the link pulse is identified to be an N-Way link pulse. In this way, the choice of time interval measurement circuits is not critical to reliably distinguish 10BASE-T, 100BASE-T, and N-Way link pulses.

Figure 7A:
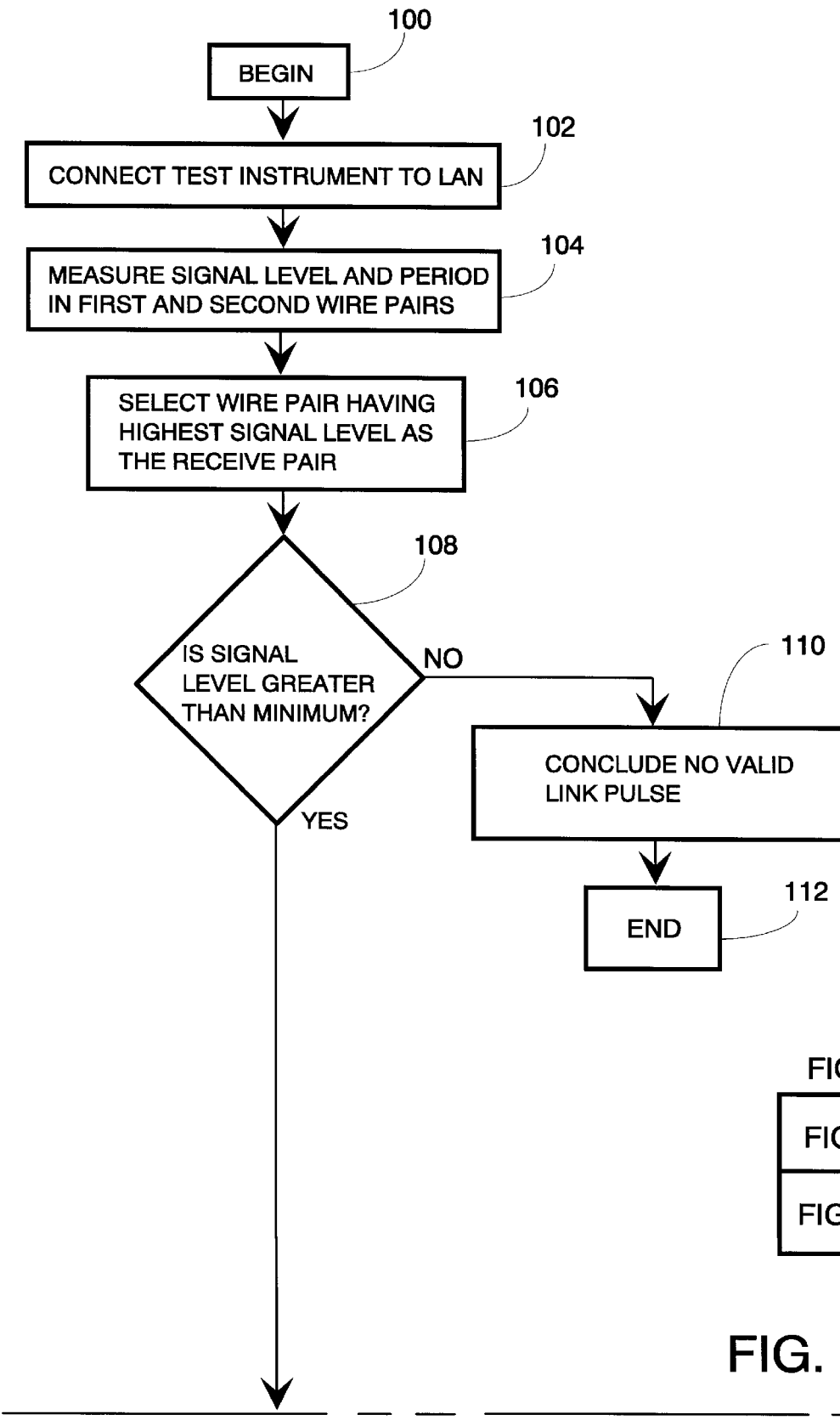
FIG. 7A and 7B are a flow diagram showing a method for determining network speed using the speed sensing circuit of FIG. 2.
Figure 7B:
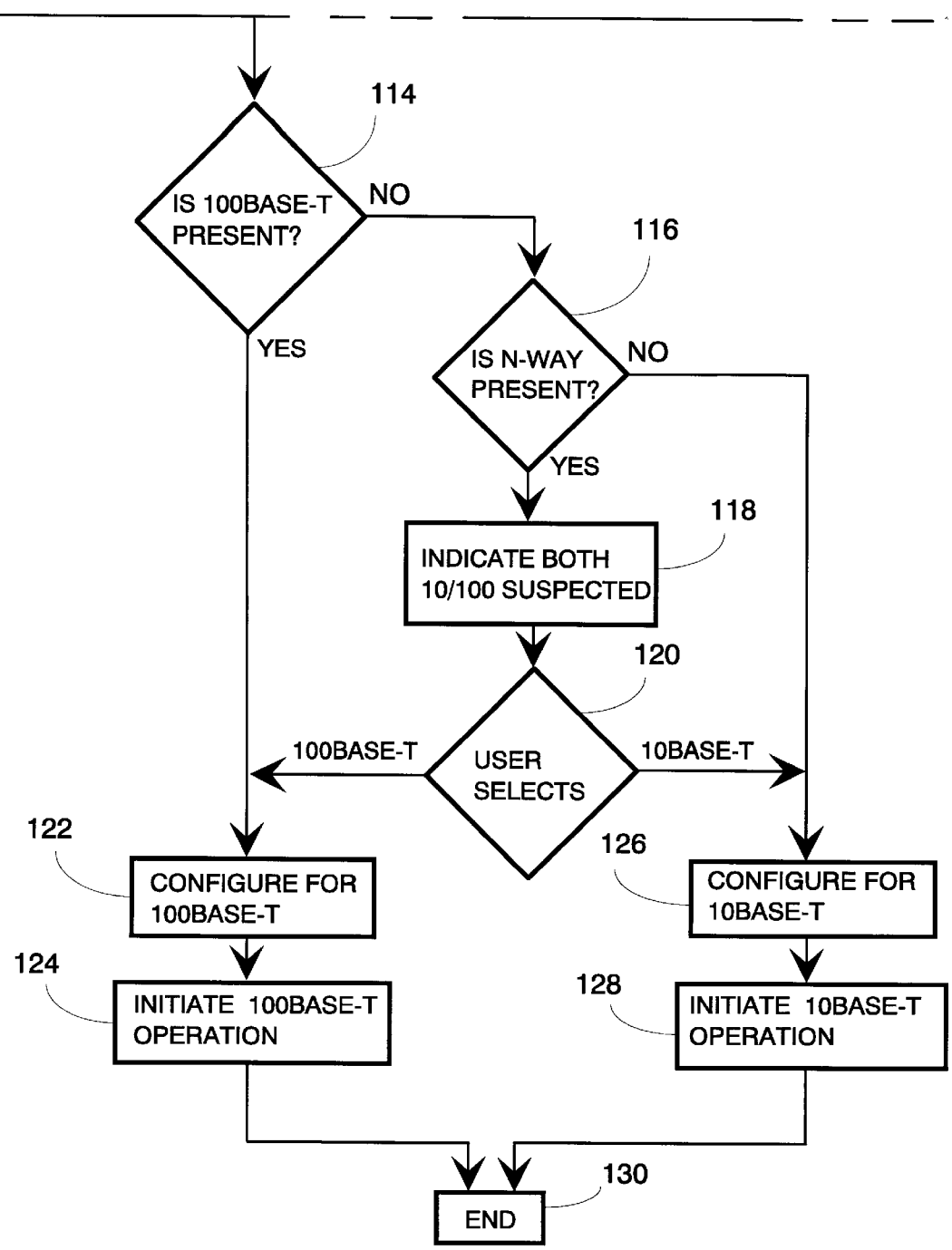

FIG. 7A and 7B together comprise a flow chart of the process of determining network speed and configuring the test instrument according to the present invention. In FIG. 7A, the proper transmit and receive pairs and the presence of a link pulse of adequate amplitude are determined. In FIG. 7B, the network speed according to 10BASE-T, 100BASE-T, or 10/100 according to an N-Way link pulse is determined.

Step 100 labeled BEGIN initiates the method according to the present invention which may be started manually by the user of the test instrument 10 or automatically by software control upon connection of the test instrument 10 to the LAN 12. The method may be started as often as needed to determine the network speed of the LAN 12.

Step 102 labeled CONNECT TEST INSTRUMENT TO LAN shows the step of physically connecting the test instrument 10 to the LAN 12 via the patch cord 14. The speed of the LAN 12 at the point of connection is typically not known. It is also not known which of the twisted-wire pairs are the transmit and receive pairs. Typically, a link pulse is available but no communications between the LAN 12 and the test instrument 10 have been established yet. The 10BASE-T chipset 48 and 100BASE-T chipset 50 are powered off and not yet coupled to the connector 32.

Step 104 labeled MEASURE SIGNAL LEVEL AND PERIOD IN FIRST AND SECOND WIRE PAIRS shows the step of determining which of the wires 34a–d contains the link pulse. The link pulse is typically a differential signal coupled across one of the twisted-wire pairs within the link that is the receive pair.

In step 106 labeled SELECT WIRE PAIR HAVING HIGHEST SIGNAL LEVEL AS THE RECEIVE PAIR, the proper receive pair is selected. In the preferred embodiment, the relative signal levels received on both wire pairs are measured and compared using an analog to digital converter (not shown) because there may be some level of link pulse present on both wire pairs due to cross-talk effects. The wire pair having the highest amplitude signal is the receive pair. The data/parametric switch 36 (shown in FIG. 2) is by default set to the parametric position so that the link pulse may be coupled to the MUX 38. The MUX 38 may be controlled by the microprocessor 44 to select one of the wires 34a–d to couple to the comparator 40 to properly receive the link pulse from the LAN 12. The test instrument 10 is now configured for the proper transmit and receive pairs.

In step 108 labeled IS SIGNAL LEVEL GREATER THAN MINIMUM?, the presence or absence of the link pulse is determined. The REFERENCE voltage level on the comparator 40 (shown in FIG. 2) may be set high enough so that only the proper receive pair having sufficient signal amplitude would allow the trigger signal to be generated. In this way, the presence of noise on the receive pair would be distinguished from the presence of an actual link pulse.

In step 110 labeled CONCLUDE NO VALID LINK PULSE, if there is not a sufficient signal amplitude to generate a trigger pulse for a given setting of the REFERENCE voltage, then the conclusion is there is no valid link pulse and the process ends at step 112 labeled END.

Referring now to FIG. 7B, in step 114 labeled IS 100BASE-T PRESENT? the timer 42 is used to measure the time interval between a trigger signal generated by the comparator 40 and arming time in the manner illustrated in FIG. 3, FIG. 4A–B and FIG. 5A–B. If there is a 100BASE-T link pulse as illustrated by the waveform 70 in FIG. 3, the measurement values returned by the timer 42 will all correspond to short time intervals corresponding to values less than the time interval of T2–T1, leading to the conclusion that a 100BASE-T link pulse is present. If there is a 10BASE-T link pulse as illustrated in FIG. 4A by the waveform 74 or an N-Way link pulse as illustrated by the waveform 78 in FIG. 5A, long time intervals are returned as time values, leading to the conclusion that a 100BASE-T link is not present.

The time values received by the microprocessor 44 from the timer 42 must be valid for any particular measurement. A valid time value would normally be obtained from the measured time interval between a link pulse and the arming signal. An invalid time value would be due to the measurement of extraneous noise such as power line noise which occurs at a frequency range substantially lower than that expected of any link pulse.

The validity determination may be performed in a number of ways, typically involving collecting and combining multiple time values to form a composite time value and looking for consistency between the time values. Such a consistency determination may be done using well-known statistical techniques such as standard deviations, a simple comparison with a set of expected values, or by taking an average of the time values. If it is determined that the time values are not valid, the method loops back to continue acquiring more time values. If it is determined that the composite time value is valid so as to make a decision regarding the presence of long time intervals and short time intervals, the method continues on with the next step.

A mathematical comparison of the composite time value to a decision value chosen to discriminate between time values from the link pulses corresponding to the 10BASE-T and 100BASE-T protocols. The decision value may be determined empirically simply by observing time values from the link pulse at various network speeds or derived according to the expected time intervals based on industry-standard definitions of the various link pulses. From the results of comparison of the composite measurement value to the decision value 90 (shown in FIG. 6), the link pulse is concluded to be from a slower 10BASE-T protocol, a faster 100BASE-T protocol, or from a device capable of either protocol and is advertising that capability by generating the N-Way link pulse.

In step 116 labeled IS N-WAY PRESENT?, the presence of long time interval time values returned from the timer 42 indicates the presence of either the 10BASE-T link pulse or the N-Way link pulse. Further measurements according to FIG. 4B and FIG. 5B are conducted in which long time interval values returned according to FIG. 4B provides for the detection of the 10BASE-T while short time interval values returned according to FIG. 5B provides for the detection of the N-Way link pulse.

In step 118 labeled INDICATE BOTH 10/100 SUSPECTED, the N-Way link pulse, also called the 10/100 pulse, has been detected. The presence of the N-Way link pulse allows the user of the test instrument 10 to manually make a choice as to speed, either 10BASE-T or 100BASE-T. The indication of 10/100 may thus take the form of a user prompt on a display of the test instrument 10. In the step 120 labeled USER SELECTS, the user may enter a choice of 10BASE-T or 100BASE-T in response to the user prompt generated in the step 118. The choice may also be predetermined, such as by selecting a default value, in the case of the choice presented in the step 118.

Step 122 labeled CONFIGURE FOR 100BASE-T OPERATION involves setting the switches 36a–e of the chip select switch to the 100BASE-T position, thereby connecting the 100BASE-T chipset 50 to the wires 34a–d to send and receive data signals to and from the LAN 12 and further applying D.C. power to the 100BASE-T chipset 50. In this way, the 100BASE-T chipset 50 matching the 100 megabit per second speed of the LAN 12 is powered up and coupled to the LAN 12 only after the speed is determined.

Step 124 labeled INITIATE 10BASE-T OPERATION involves initiating communication with the LAN 12 at a compatible network speed.

Step 126 labeled ACTIVATE 100BASE-T CHIPSET involves alternatively setting the switches 36a–e of the chip select switch to the 100BASE-T position, thereby connecting the 100BASE-T chipset 48 to the wires 34a–d to send and receive data signals to and from the LAN 12 and further applying D.C. power to the 10BASE-T chipset 48. In this way, the 10BASE-T chipset 48 matching the 10 megabit per second speed of the LAN 12 is powered up and coupled to the LAN 12 only after the speed is determined.

Step 128 labeled INITIATE 10BASE-T OPERATION involves initiating communication with the LAN 12 at a compatible network speed.

Step 130 labeled END terminates the method following the activation of the appropriate chipset. The method may be readily repeated to determine the network speed as the test instrument 10 is connected and re-connected to the LAN 12 as is typically done in service, installation, and maintenance applications.

It will be obvious to those having ordinary skill in the art that many changes may be made in the details of the above described preferred embodiments of the invention without departing from the spirit of the invention in its broader aspects. For example, the 10BASE-T chipset 48 and the 100BASE-T chipset 50 exist as separate chipsets only because such separate chipsets are expedient as currently available technology. The present invention may be readily adapted to accommodate a single dual-speed chipset that would benefit from a prior determination of the speed of the LAN before being coupled to the LAN 12. The present invention may also be readily adapted for greater than two chipsets and still achieve the advantages of battery power conservation and the detection of the network speed prior to coupling the appropriate chipset to the LAN 12. The present invention may be further adapted to applications in which data signals from the network are available rather than only the link pulse, in order to determine the network speed before powering up the appropriate chipset. Therefore, the scope of the present invention should be determined by the following claims.

What we claim as our invention is:

1. In a test instrument for testing a LAN, a circuit for determining a speed of said LAN, comprising:
    (a) a connector for coupling to said LAN to receive link pulses;
    (b) a comparator coupled to said connector to receive said link pulses, said comparator comparing said link pulses to a reference voltage to produce trigger signals;
    (c) a timer circuit coupled to said comparator for receiving said trigger signals to produce time values; and
    (d) a microprocessor coupled to said timer circuit to receive said time values, said microprocessor comparing said time values against a decision value to produce a decision about said speed of said LAN.

2. In a test instrument for testing a LAN, a circuit for determining a speed of said LAN according to claim 1 wherein said decision comprises 10BASE-T link pulse, 100BASE-T link pulse, and N-Way link pulse.

3. In a test instrument for testing a LAN, a circuit for determining a speed of said LAN according to claim 2 further comprising a data/parametric switch interposed between said connector and said comparator and further coupled to a selected chipset comprising one of a 10BASE-T chipset and a 100BASE-T chipset, said data/parametric switch coupling said connector to said comparator in a parametric position and further coupling said connector to said selected chipset in said data position responsive to said decision.

4. In a test instrument for testing a LAN, a circuit for determining a speed of said LAN according to claim 3 further comprising a chip select switch interposed between said data/parametric switch and said selected chipset, said chip select switch coupling said connector to one of said 10BASE-T chipset and said 100BASE-T chipset responsive to said decision.

5. In a test instrument for testing a LAN, a circuit for determining a speed of said LAN according to claim 4 wherein said chip select switch couples said 10BASE-T chipset to said connector when said decision is said 10BASE-T link pulse.

6. In a test instrument for testing a LAN, a circuit for determining a speed of said LAN according to claim 4 wherein said chip select switch couples said 100BASE-T chipset to said connector when said decision is said 100BASE-T link pulse.

7. In a test instrument for testing a LAN, a circuit for determining a speed of said LAN according to claim 4 wherein said chip select switch couples said selected chipset to said connector responsive to a default chipset when said decision is said N-Way link pulse.

8. In a test instrument for testing a LAN, a circuit for determining a speed of said LAN according to claim 4 wherein said chip select switch couples d.c. power to said selected chipset responsive to said decision.

9. In a test instrument for testing a LAN, a circuit for determining a speed of said LAN according to claim 1 wherein said connector further comprises a plurality of twisted-wire pairs.

10. In a test instrument for testing a LAN, a circuit for determining a speed of said LAN according to claim 9 further comprising a multiplexer interposed between said plurality of twisted-wire pairs and said comparator wherein said multiplexer selectively couples at least one of said twisted-wire pairs to said comparator to determine the receive pair.

11. In a test instrument for testing a LAN, a circuit for determining a speed of said LAN, comprising:
    (a) a connector for coupling to said LAN to receive link pulses;
    (b) a comparator coupled to said connector to receive said link pulses, said comparator comparing said link pulses to a reference voltage to produce trigger signals;
    (c) a timer circuit coupled to said comparator for receiving said trigger signals to produce time values; and
    (d) a microprocessor coupled to said timer circuit to receive said time values, said microprocessor comparing said time values against a decision value to produce a decision wherein said decision comprises 10BASE-T link pulse, 100BASE-T link pulse, and N-Way link pulse; and
    (e) a data/parametric switch interposed between said connector and said comparator and further coupled to a selected chipset, said data/parametric switch coupling said connector to said comparator in a parametric position and further coupling said connector to said selected chipset responsive to said decision.

12. In a test instrument for testing a LAN, a circuit for determining a speed of said LAN according to claim 11 further comprising a chip select switch interposed between said data/parametric switch and said selected chipset, said chip select switch coupling said connector to said selected chipset responsive to said decision.

13. In a test instrument for testing a LAN, a circuit for determining a speed of said LAN according to claim 12 wherein said chip select switch couples said 10BASE-T chipset to said connector when said decision is said 10BASE-T link pulse.

14. In a test instrument for testing a LAN, a circuit for determining a speed of said LAN according to claim 12 wherein said chip select switch couples said 100BASE-T chipset to said connector when said decision is said 100BASE-T link pulse.

15. In a test instrument for testing a LAN, a circuit for determining a speed of said LAN according to claim 12 wherein said chip select switch couples said selected chipset to said connector responsive to a default chipset when said decision is said N-Way link pulse.

16. In a test instrument for testing a LAN, a circuit for determining a speed of said LAN according to claim 12 wherein said chip select switch couples d.c. power to said selected chipset responsive to said decision.

17. In a test instrument for testing a LAN, a circuit for determining a speed of said LAN according to claim 11 wherein said connector further comprises a plurality of twisted-wire pairs.

18. In a test instrument for testing a LAN, a circuit for determining a speed of said LAN according to claim 17 further comprising a multiplexer interposed between said plurality of wires and said comparator wherein said multiplexer selectively couples at least one of said twisted-wire pairs to said comparator to determine the receive pair.

19. In a test instrument for testing a LAN, a method for determining a speed of said LAN, comprising:

(a) coupling said test instrument to said LAN to receive a link pulse;

(b) comparing said link pulse against a reference voltage to produce a trigger signal;

(c) measuring said trigger signal to obtain time values; and (d) comparing said time values against a decision value to reach a decision about said speed.

20. In a test instrument for testing a LAN, a method for determining a speed of said LAN according to claim 19 further comprising comparing said link pulse to a minimum level to determine if said link pulse is valid.

21. In a test instrument for testing a LAN, a method for determining a speed of said LAN according to claim 19, said link pulse further comprising one of a 10BASE-T link pulse, a 100BASE-T link pulse, and an N-Way link pulse.

22. In a test instrument for testing a LAN, a method for determining a speed of said LAN according to claim 19 further comprising comparing said time values against said decision value to determine long time intervals and short time intervals.

23. In a test instrument for testing a LAN, a method for determining a speed of said LAN according to claim 19 further comprising:

(a) applying d.c. power to a selected chipset responsive to said decision; and (b) coupling said data signals to said selected chipset.

24. In a test instrument for testing a LAN, a method for determining a speed of said LAN according to claim 19 further comprising determining a transmit pair and a receive pair within said LAN.

* * * * *